US012589602B2

(12) United States Patent
Taniguchi et al.

(10) Patent No.: US 12,589,602 B2
(45) Date of Patent: Mar. 31, 2026

(54) PRINTING APPARATUS INCLUDING PROCESSING MEMBER FOR PROCESSING A PRINT MEDIUM

(71) Applicant: BROTHER KOGYO KABUSHIKI KAISHA, Nagoya (JP)

(72) Inventors: Yoshimitsu Taniguchi, Tajimi (JP); Yusuke Arai, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 535 days.

(21) Appl. No.: 18/065,087

(22) Filed: Dec. 13, 2022

(65) Prior Publication Data

US 2023/0202215 A1 Jun. 29, 2023

(30) Foreign Application Priority Data

Dec. 24, 2021 (JP) ................................ 2021-211496

(51) Int. Cl.

*B41J 11/66* (2006.01)
*B41J 11/00* (2006.01)
*B41J 11/70* (2006.01)
*B41J 13/00* (2006.01)
*B41J 13/03* (2006.01)
*B41J 11/68* (2006.01)

(52) U.S. Cl.

CPC .......... *B41J 11/663* (2013.01); *B41J 11/0095* (2013.01); *B41J 11/70* (2013.01); *B41J 13/0036* (2013.01); *B41J 13/03* (2013.01); *B41J 11/68* (2013.01)

(58) Field of Classification Search

CPC ....... B41J 11/663; B41J 11/0095; B41J 11/70; B41J 13/03; B41J 11/68; B41J 13/0036

See application file for complete search history.

(56) References Cited

U.S. PATENT DOCUMENTS

2005/0162494 A1* 7/2005 Inokuchi ............... B41J 11/006 347/104
2015/0091966 A1 4/2015 Nagaoka
(Continued)

FOREIGN PATENT DOCUMENTS

JP 2000-117690 A 4/2000
JP 2015-150774 A 8/2015
(Continued)

*Primary Examiner* — Henok D Legesse
(74) *Attorney, Agent, or Firm* — Scully, Scott, Murphy & Presser, P.C.

(57) ABSTRACT

A printing apparatus includes: a conveying unit configured to convey a printing medium in a conveying direction; a printing unit configured to print an image on the printing medium based on print data included in a print job; a processing unit including a processing member and configured to process the printing medium by moving the processing member in a state that the processing member contacts the printing medium; and a controller configured to execute no processing process for the printing medium by the processing unit, in a case that the controller determines that a first length in the conveying direction of the printing medium conveyed by the conveying unit is shorter than a predetermined second length, during a printing process in which the image is printed on the printing medium based on the print data by the printing unit.

13 Claims, 11 Drawing Sheets

(56) References Cited

U.S. PATENT DOCUMENTS

| | | | | |
|---|---|---|---|---|
| 2018/0079231 | A1* | 3/2018 | Nagaoka | B41J 11/0095 |
| 2020/0101772 | A1* | 4/2020 | Wakakusa | B41J 11/42 |
| 2021/0178785 | A1 | 6/2021 | Miura | |
| 2021/0245525 | A1 | 8/2021 | Miura et al. | |

FOREIGN PATENT DOCUMENTS

| | | | |
|---|---|---|---|
| JP | 2018047596 | A | 3/2018 |
| JP | 2018186448 | A | 11/2018 |
| JP | 2019-34822 | A | 3/2019 |
| JP | 2021-94784 | A | 6/2021 |
| JP | 2021-123046 | A | 8/2021 |

* cited by examiner

PRINTING APPARATUS INCLUDING PROCESSING MEMBER FOR PROCESSING A PRINT MEDIUM

REFERENCE TO RELATED APPLICATIONS

This application claims priority from Japanese Patent Application No. 2021-211496 filed on Dec. 24, 2021. The entire content of the priority application is incorporated herein by reference.

BACKGROUND ART

Conventionally, an image forming apparatus including a cutting unit is known. The cutting unit is configured to cut a sheet that is being conveyed for printing. This image forming apparatus forms an image on a sheet, and then cuts the sheet to produce two sheets by causing two blades to move across the sheet in such a way that the two blades cross each other.

DESCRIPTION

In this image forming apparatus, if there is a variation in sizes of sheets stored in a feeding cassette, a designated sheet size and the size of the sheet conveyed by the sheet conveying unit may be different. In this case, the cutting unit may not be able to cut the sheet while the sheet is nipped by the sheet conveying unit. If the sheet cannot be cut in a state where the sheet is nipped by the sheet conveying unit, the sheet is cut with weak nipping force, and the cutting operation may cause the sheet to shift, resulting in a decrease in cutting quality. An object of the present disclosure is to provide a printing device that prevents deterioration of processing quality.

According to an aspect of the present disclosure, there is provided a printing apparatus, including:

- a conveying unit configured to convey a printing medium in a conveying direction;
- a printing unit configured to print an image on the printing medium based on print data included in a print job;
- a processing unit including a processing member and configured to process the printing medium by moving the processing member in a state that the processing member contacts the printing medium; and
- a controller configured to execute no processing process for the printing medium by the processing unit, in a case that the controller determines that a first length in the conveying direction of the printing medium conveyed by the conveying unit is shorter than a predetermined second length, during a printing process in which the image is printed on the printing medium based on the print data by the printing unit.

According to the above configuration, in the printing process, the controller determines whether the first length is shorter than the second length. If the controller determines that the first length is shorter than the second length, the processing process by the processing unit is not executed. Therefore, when a printing medium shorter than expected is conveyed, the processing process is not executed, and thus the deviation of the printing medium due to a processing operation can be suppressed. Therefore, the quality of processing of the printing medium can be prevented from deteriorating.

In the printing apparatus according to the aspect, the controller may be configured to calculate the first length based on conveyance amount of the printing medium conveyed by the conveying unit.

According to the above configuration, the first length is calculated based on the conveyance amount of the printing medium. Therefore, accuracy of determining whether or not the processing process is necessary can be improved.

In the printing apparatus according to the aspect, the second length may be a length in the conveying direction associated with a paper sheet size designated in the print job.

According to the above configuration, the second length can be a paper length corresponding to the paper size. Therefore, the accuracy of determining whether or not the processing process is necessary can be further improved.

The printing apparatus according to the aspect may further include a detecting unit arranged upstream in the conveying direction from the conveying unit and configured to detect the printing medium conveyed by the conveying unit, wherein

- in a state of the printing medium being conveyed to a processing position of the processing unit,
  - in a case that the detection unit detects the printing medium, the controller may be configured to execute the processing process, and
  - in a case that the detection unit does not detect the printing medium, the controller may be configured not to execute the processing process.

According to the above configuration, the detection unit is provided upstream in the conveying direction from the conveying unit. It is determined whether to execute the processing process, based on whether or not the detection unit detects the printing medium in the state that the printing medium is conveyed to the processing position of the processing unit. Namely, in a case of the conveyed printing medium being detected by the detection unit, the conveying unit is nipping the printing medium. Therefore, the processing process can be executed with the printing medium being nipped by the conveying unit. Therefore, the printing medium can be prevented from being displaced by a processing operation of the processing unit. In other words, the processing quality of the printing medium is prevented from deteriorating.

In the printing apparatus according to the aspect, the conveying unit may be arranged upstream in the conveying direction from the printing unit.

In the printing apparatus according to the aspect, in a state of the printing medium being conveyed to the processing position of the processing unit after the detecting unit has detected a trailing edge of the printing medium,

- in a case that the printing medium is nipped by the conveying unit, the controller may be configured to execute the processing process, and
- in a case that the printing medium is not nipped by the conveying unit, the controller may be configured not to execute the processing process.

According to the above configuration, even after the trailing edge of the printing medium is detected by the detection unit, if the printing medium is nipped by the conveying unit located upstream from the printing unit in the state that the printing medium is conveyed to the processing position of the processing unit, the processing process is executed. On the other hand, in a case that the printing medium is not nipped by the conveying unit located upstream from the printing unit, the processing process is not executed. Therefore, even if the trailing edge of the printing medium has passed through the detection unit, it is possible to determine whether or not the processing process is necessary.

In the printing apparatus according to the aspect, in a case that the controller executes no processing process, the controller may be configured to complete the printing process.

According to the above configuration, in a case that the processing process is not executed, the printing process on the printing medium is completed. Therefore, printing on the printing medium can be completed while preventing deterioration of the processing quality for the printing medium.

In the printing apparatus according to the aspect, in a case that the controller receives a plurality of print jobs including the print job and does not execute the processing process based on a first print job included in the print jobs, the controller may be configured to complete the printing process based on the first print job and cancel a second print job subsequent to the first print job.

According to the above configuration, the subsequent print job among the received print jobs is canceled. This prevents print data included in the subsequent print job from being printed, thereby reducing the amount of ink used in the printing process.

In the printing apparatus according to the aspect, in a case that the controller executes no processing process, the controller may be configured to stop the printing process.

According to the above configuration, the printing process is stopped when it is determined that the processing process will not be executed. Therefore, the amount of ink used for the printing process can be further reduced as compared with a case of canceling subsequent print jobs.

The printing apparatus according to the aspect may further include a first conveying route for conveying the printing medium in the conveying direction, wherein the controller may be configured to execute the printing process and the processing process with respect to the printing medium being conveyed along the first conveying route with a leading edge of the printing medium being positioned upstream in the conveying direction from a trailing edge of the printing medium.

According to the above configuration, the printing process and the processing process are executed on the printing medium being conveyed along the first conveying route with the leading edge of the printing medium being positioned upstream from the trailing edge. In other words, each process is executed only in the first conveying route. This means that each process can be executed, without switching the leading edge and the trailing edge of the printing medium or the front side and the rear side of the printing medium. Thus, the time from the conveyance of the printing medium until the completion of printing the print data can be shortened.

The printing apparatus according to the aspect may further include a first conveying route for conveying the printing medium in the conveying direction, wherein in a case that the first length is equal to the second length, the controller may be configured to execute the printing process and the processing process after executing a switchback process in which the printing medium is conveyed in a reverse direction opposite to the conveying direction by the conveying unit along a second conveying route different from the first conveying route, and in a case that the first length is shorter than the second length, the controller may be configured to execute a discharge process in which the printing medium is discharged outside the printing apparatus, without executing the switchback process.

According to the above configuration, a comparing process is executed by using information of the length of the printing medium conveyed before the printing process. As a result of the comparing process, if it is determined that the length is shorter than the length in the conveyance direction of the paper size designated in the print job, the conveyed printing medium is discharged to the outside. This reduces the possibility of unnecessary printing process in a case that a printing medium shorter than expected is conveyed. In addition, the amount of ink used for the printing process can be reduced.

In the printing apparatus according to the aspect, in a case that the first length is equal to the second length, the controller may be configured to execute the discharge process, and execute the printing process and the processing process with respect to another printing medium different from the printing medium discharged in the discharge process after conveying the another printing medium by the conveying unit.

According to the above configuration, when it is determined that the length in the conveyance direction of the printing medium is the same as the length in the conveyance direction of the paper size designated in the print job, the printing medium used for the comparing process is discharged, and the printing process and the processing process are executed on a different printing medium from the discharged printing medium. This further reduces the possibility of unnecessary printing process on a printing medium shorter than expected, as compared with a case where the printing process and the processing process are executed on the printing medium used for the comparing process. The amount of ink used for the printing process can also be further reduced.

In the printing apparatus according to the aspect, the processing unit may be arranged downstream in the conveying direction from the printing unit.

According to the aspect of the present disclosure, it is possible to prevent the deterioration of the processing quality.

FIRST EMBODIMENT

Configuration of Printing Apparatus

Figure 1:
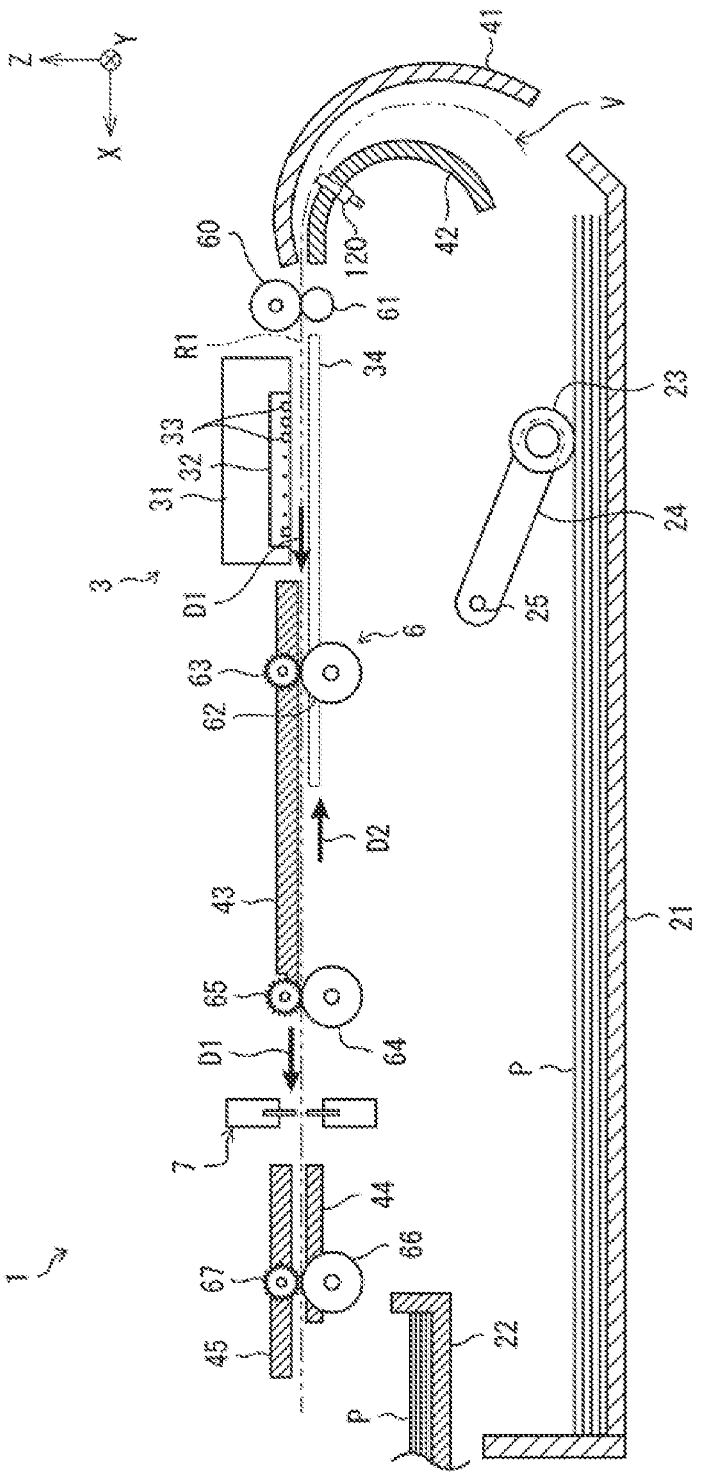
FIG. 1 is a cross-sectional view depicting an internal structure of a printing apparatus of the present disclosure.

As depicted in FIG. 1, a printing apparatus 1 is a MFP (Multi-Function Peripheral) having multiple functions such as printing function, scanning function, copying function, and facsimile function. In FIG. 1, a direction from the printing unit 3 to the cutting unit 7, which is an example of a processing unit, is a X direction, and a direction from the feed tray 21 to the printing unit 3 is a Z direction. A direction orthogonal to both the X direction and the Z direction is a Y direction. The same shall apply when referring to the X direction, Z direction, and Y direction in the following explanation.

The printing apparatus 1 has an inkjet printing function to perform printing on a paper sheet P (an example of a print medium) by ejecting ink, based on print data specified by a print job. The printing apparatus 1 may be capable of color printing or may be dedicated to monochrome printing. The printing media is not limited to paper media, but may also be other resin media, such as an OHP (Over Head Projector) sheet.

As depicted in FIG. 1, the printing apparatus 1 includes a feed tray 21, a discharge tray 22, a printing unit 3, guide members 41 to 45, a first conveying route R1, a conveying unit 6, a cutting unit 7, and a registration sensor 120 as an example of a detection unit.

The feed tray 21 is a tray for accommodating multiple sheets of paper sheet P and a top surface of the feed tray 21 is open. The discharge tray 22 is located above the feed tray 21. The discharge tray 22 is a tray for accommodating paper sheets P discharged by a conveyance roller 66 and a top surface of the discharge tray 22 is open.

Figure 2:
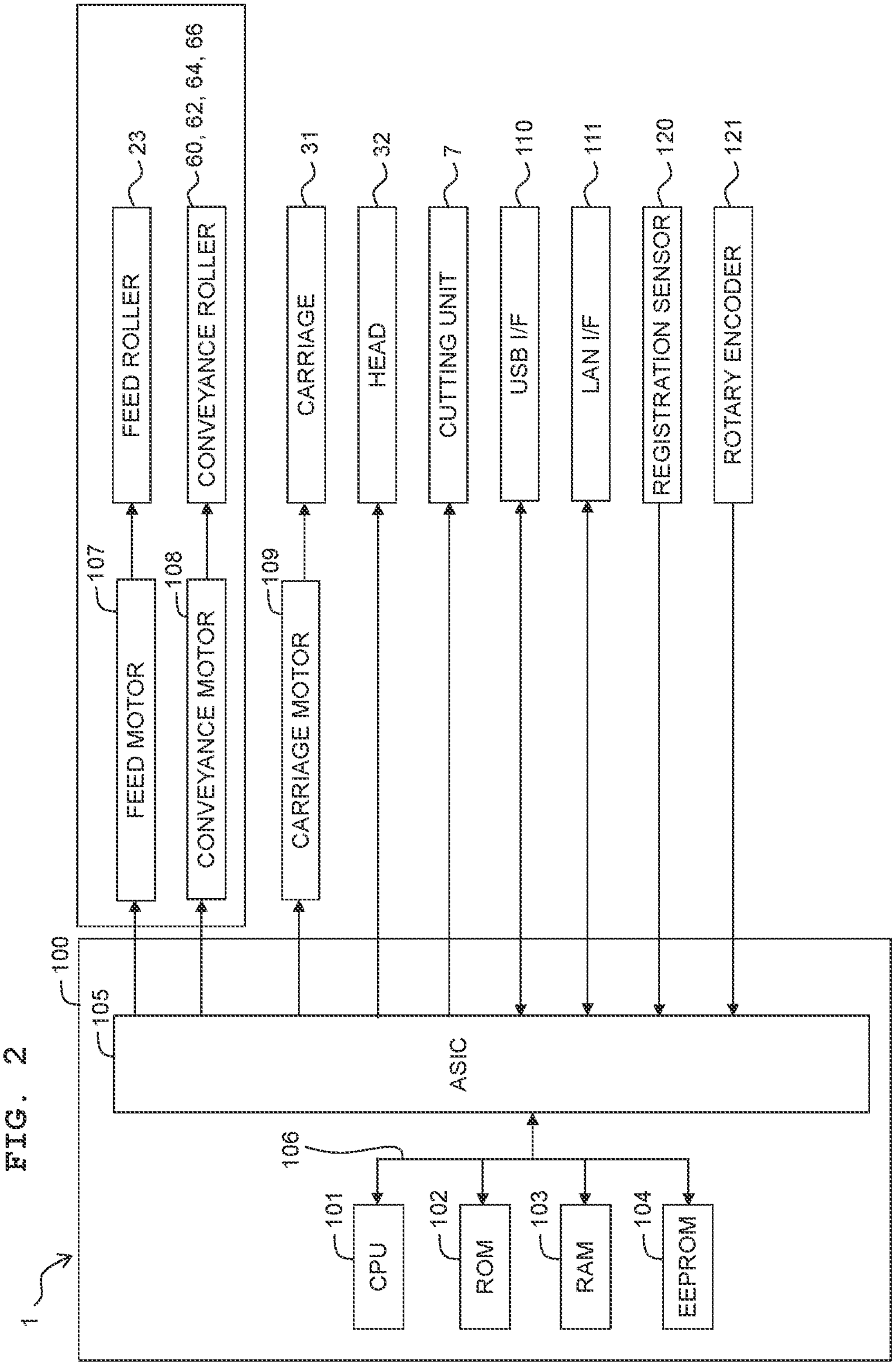
FIG. 2 is a block diagram depicting an electrical configuration of the printing apparatus depicted in FIG. 1.

Here, conveying unit 6 includes a feed roller 23, conveyance rollers 60, 62, 64, 66, a pinch roller 61, spur rollers 63, 65, 67, a feed motor 107 depicted in FIG. 2, and a conveyance motor 108 depicted in FIG. 2. The number of rollers provided in the first conveying route R1 may be changed appropriately, for example, the conveyance roller 66 and the spur roller 67 may be absent.

The feed roller 23 feeds the paper sheet P accommodated in the feed tray 21 to a conveyance starting position V in the first conveying route R1. The feed roller 23 is rotatably supported at a tip of a feed arm 24. The feeding arm 24 is rotatably supported by a shaft 25 supported by a frame of the printing apparatus 1. The feed roller 23 rotates positively when the feed motor 107 is driven. As the feed roller 23 rotates positively, the paper sheets accommodated in the feed tray 21 are fed one by one to the conveyance starting position V in the first conveying route R1.

The first conveying route R1 is a route that extends upward from a rear end of the feed tray 21, curves in an area demarcated by the guide members 41, 42, passes through a position of the printing unit 3, extends linearly in an area demarcated by guide members 43, 44, 45, and reaches the discharge tray 22. The conveying direction D1 is a direction from the feed tray 21 to the cutting unit 7 via the printing unit 3 in the first conveying route R1.

In the first conveying route R1, the conveyance roller 60 is provided upstream of the conveying unit 3 in the conveying direction D1. The pinch roller 61 is provided at a position facing a lower part of the conveyance roller 60. The conveyance roller 60 and the pinch roller 61 nip the paper sheet with a stronger load than the conveyance rollers 62, 64, 66 and the spur rollers 63, 65, 67 which are provided downstream of the conveying unit 3 in the conveying direction D1.

The conveyance roller 60 is driven by the conveyance motor 108. The pinch roller 61 rotates along with a rotation of the conveyance roller 60. As the conveyance roller 60 and the pinch roller 61 rotate positively, the paper sheet P is held by the conveyance roller 60 and the pinch roller 61, and is conveyed to the printing section 3.

In the first conveying route R1, the printing unit 3 is located between the conveyance roller 60 and the conveyance roller 62. The printing section 3 records an image on the paper sheet P conveyed in the conveying direction D1 by the conveying unit 6. The printing section 3 has a carriage 31, a head 32, nozzles 33, and a platen 34. The head 32 is mounted on the carriage 31. A plurality of nozzles 33 are formed on a lower surface of the head 32. The head 32 ejects ink from the nozzles 33. The platen 34 is a rectangular plate-shaped member on which the paper sheet P is placed. The image is recorded on the paper sheet P by ejecting the ink from the nozzles 33 selectively onto the paper sheet P supported by the platen 34 while the carriage 31 is moving.

Driving force is transmitted from a carriage motor 109 depicted in FIG. 2 to the carriage 31, and the carriage 31 reciprocates along the Y direction, that is, in a width direction of the paper sheet P. A controller 100 depicted in FIG. 2 causes the ink to be ejected from the nozzle 33 while moving the carriage 31 along the width direction of the paper sheet P in a state that the conveyance of the paper sheet P is paused, to record an image of one line on the paper sheet P. Further, the controller 100 causes the conveying unit 6 to convey the paper sheet P by a predetermined conveyance amount. The controller 100 records the image on the paper sheet P by repeating these processes.

In the first conveying route R1, the conveyance roller 62 is provided downstream of the conveying unit 3 in the conveying direction D1. The spur roller 63 is provided at a position facing an upper part of the conveyance roller 62. The conveyance roller 62 is driven by the conveyance motor 108. The spur roller 63 rotates along with a rotation of the conveyance roller 62. As the conveyance roller 62 and the spur roller 63 rotate positively, the paper sheet P is held between the conveyance roller 62 and the spur roller 63 and is conveyed downstream in the conveying direction D1.

In the first conveying route R1, the conveyance roller 64 is provided downstream of the conveyance roller 62 in the conveying direction D1. The spur roller 65 is provided at a position facing an upper part of conveyance roller 64. The conveyance roller 64 is driven by the conveyance motor 108. The spur roller 65 rotates along with a rotation of the conveyance roller 64. As the conveyance roller 64 and the spur roller 65 rotate positively, the paper sheet P is held between the conveyance roller 64 and the spur roller 65 and is conveyed to the cutting unit 7.

Figures 4A, 4B:
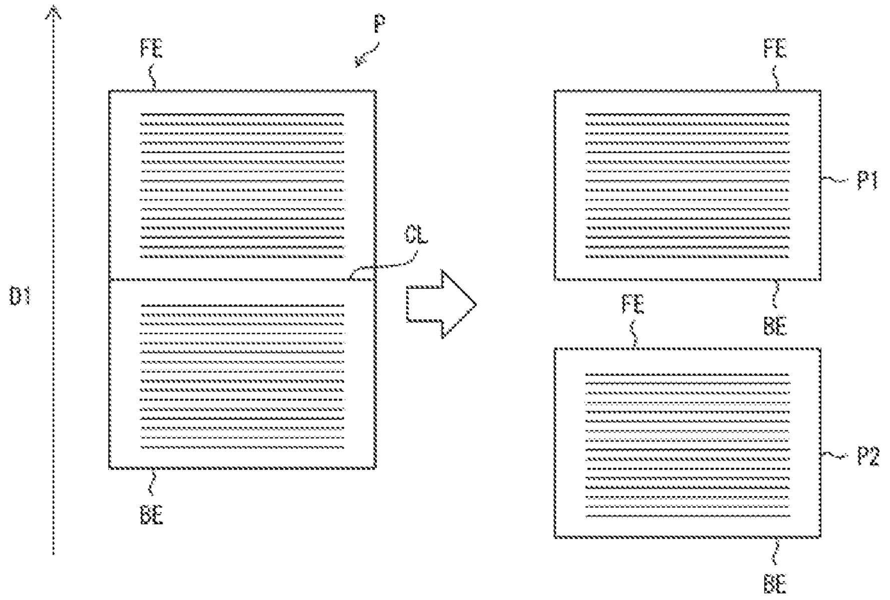
FIG. 4A depicts a paper sheet before cutting.
FIG. 4B depicts a first paper sheet and a second paper sheet after cutting the paper sheet.

In the first conveying route R1, the cutting unit 7 is arranged between the conveyance roller 64 and the conveyance roller 66. In other words, the cutting unit 7 is arranged downstream of the printing unit 3 in the conveying direction D1. The cutting unit 7 cuts the paper sheet P that is conveyed by the conveying unit 6 after the image has been recorded by the printing unit 3. Specifically, the cutting unit 7 is a well-known cutter mechanism that has a pair of upper and lower blades and a cutter carriage, and cuts the paper sheet P with the pair of upper and lower blades. Specifically, the cutting unit 7 moves the cutter carriage in the width direction of the paper sheet P to cut the paper sheet P at a cutting position CL as an example of a dividing position of the paper sheet P. The cutting position CL is depicted in FIG. 4A.

The upper blade and the lower blade of the cutting unit 7 are both circular round blades. Both the upper round blade and the lower round blade are provided on the cutter carriage. One blade of the upper and lower blades may be a fixed blade and the other blade of the upper and lower blades may be a round blade. In this case, the round blade is installed on the cutter carriage and the fixed blade is fixed to the frame of the printing apparatus 1.

The cutting unit 7 may have no cutter carriage. In this case, the cutting unit 7 has fixed blades extending in the Y direction on an upper side and a lower side of the first conveying route R1. The cutting unit 7 cuts the paper sheet P at the cutting position CL in the width direction by moving these fixed blades so that the upper fixed blade and the lower fixed blade are closer to each other. The cutting unit 7 may be configured to have only one of the upper blade and the lower blade.

In the first conveying route R1, the conveyance roller 66 is provided downstream of the cutting unit 7 in the conveying direction D1. The spur roller 67 is provided at a position facing an upper part of the conveyance roller 66. The conveyance roller 66 is driven by the conveyance motor 108. The spur roller 67 rotates along with a rotation of the conveyance roller 66. As the conveyance roller 66 and the spur roller 67 rotate positively, the paper sheet P is held between the conveyance roller 66 and the spur roller 67, and is discharged to the discharge tray 22.

In the conveying route R1, the registration sensor 120, which is an example of a detection unit, is arranged upstream of the conveyance roller 60 and the pinch roller 61 in the conveying direction D1. The registration sensor 120 detects the paper sheet P conveyed in the first conveying route R1. More precisely, the registration sensor 120 detects a leading edge (FE) and a trailing edge (BE) of the paper sheet P conveyed in the first conveying route R1. The leading edge FE and the trailing edge BE of the paper sheet P are depicted in FIG. 4A. As the registration sensor 120, a sensor having an actuator that swings when the paper sheet P contacts the actuator, or an optical sensor can be used.

The registration sensor 120 outputs an ON signal in a state that the paper sheet P is passing through a position of the registration sensor 120. The registration sensor 120 outputs an OFF signal in a state that the paper sheet P is not passing through the position of the registration sensor 120. Namely, the registration sensor 120 outputs the ON signal during a period from when the leading edge FE of the paper sheet P reaches the position of the registration sensor 120 until the trailing edge BE of the paper sheet P passes the position of the registration sensor 120, and outputs the OFF signal during other periods. The detection signals by the registration sensor 120 are output to the controller 100.

The conveyance roller 60 is provided with a rotary encoder 121 that detects the rotation of the conveyance roller 60. The rotary encoder 121 depicted in FIG. 2 outputs pulse signals in response to the rotation of the conveyance roller 60 to the controller 100. The rotary encoder 121 has an encoder disk and an optical sensor. The encoder disk 121 rotates along with the conveyance roller 60. The optical sensor reads the rotating encoder disk, generates the pulse signals, and outputs the generated pulse signals to the controller 100.

Electric Configuration of Printing Apparatus

As depicted in FIG. 2, the printing apparatus 1 has, in addition to the above-described parts, the controller 100, the carriage motor 109, an USB interface (I/F) 110, a LAN interface (I/F) 111, and the rotary encoder 121.

The controller 100 has a CPU (Central Processing Unit) 101, a ROM (Read Only Memory) 102, a RAM (Random Access Memory) 103, an EEPROM 104 (EEPROM is a registered trademark of Renesas Electronics Corporation), and an ASIC 105 (Application Specific Integrated Circuit), which are all connected by an internal bus 106.

The ROM 102 stores programs and the like for the CPU 101 to control various operations. The RAM 103 is used as a storage area to temporarily store data and signals which are used by the CPU 101 in executing the programs, or a working area for data processing.

The EEPROM 104 stores, for example, information about paper lengths associated with sizes of multiple types of the paper sheet P. The information about the paper lengths associated with the sizes of the multiple types of the paper sheet P is not limited to be stored in the EEPROM 104. For example, the information about the paper lengths associated with the sizes of the multiple types of the paper sheet P may be stored in ROM 102.

The controller 100 controls the feed motor 107, the conveyance motor 108, the carriage motor 109, the head 32, the cutting unit 10, and the like, based on a control program read out from the ROM 102.

The ASIC 105 is connected with the feed motor 107, the conveyance motor 108, the carriage motor 109, the head 32, the cutting unit 7, the USB interface 110, the LAN interface 111, the registration sensor 120, and the rotary encoder 121.

ASIC 105 supplies drive current to the feed motor 107, the conveyance motor 108, and carriage motor 109. The controller 100 controls the rotations of the feed motor 107, the conveyance motor 108, and the carriage motor 109, by using, for example, PWM (Pulse Width Modulation) control.

The controller 100 also applies drive voltage to vibrating elements of the head 32 to eject the ink from the nozzles 33. The controller 100 detects a status of the printing apparatus 1 based on the signals output from the registration sensor 120 and the rotary encoder 121.

The USB interface 110 is connected with a USB (Universal Serial Bus) memory, a USB cable and the like. The LAN interface 111 is connected with a PC (Personal Computer) via a LAN (Local Area Network) cable. When the controller 100 receives a print job via the USB interface 110 or the LAN interface 111, the controller 100 controls the various parts of the printing apparatus 1 to record the image of the print data designated by the print job onto the paper sheet P.

Control Flow by Controller

Figure 3:
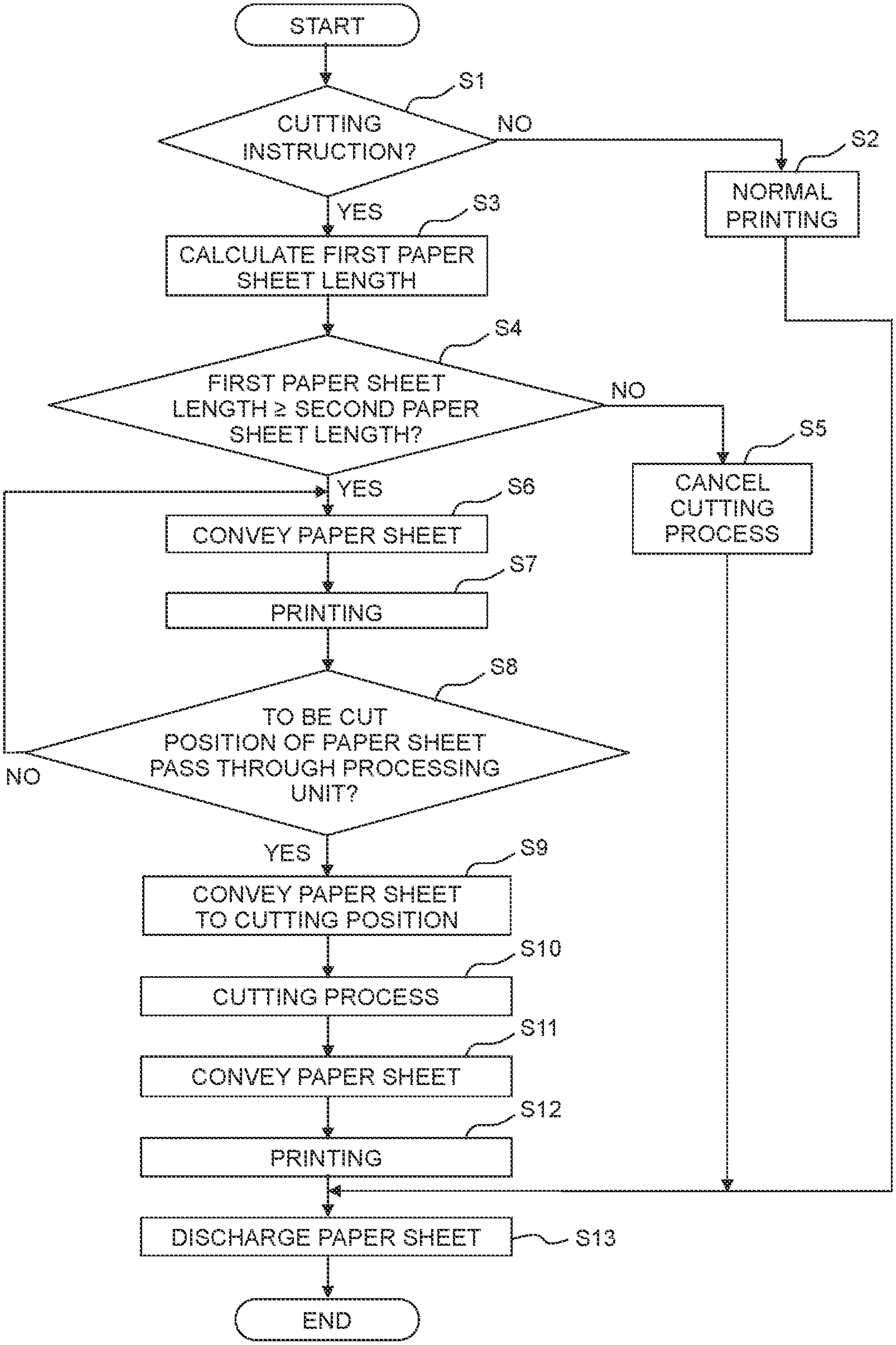
FIG. 3 is a flowchart depicting a control flow by a controller of the printing apparatus.

FIG. 3 is a flowchart depicting a control flow by the controller 100 of the printing apparatus 1. FIG. 4A depicts the paper sheet P before cutting, and FIG. 4B depicts a first paper sheet P1 and a second paper sheet P2 after cutting the paper sheet P.

In a step S1, when the printing apparatus 1 is turned on and a print job is received via the USB interface 110 or the LAN interface 111, the controller 100 determines whether the print job includes a processing instruction. Note that the processing instruction in this embodiment is described as a cut printing instruction to cut the paper sheet P.

If the controller 100 determines that the print job does not include the cut printing instruction (S1: NO), the controller 100 executes a normal printing by the printing apparatus 1 in a step S2. The normal printing means a printing performed without cutting the paper sheet P.

On the other hand, if the controller 100 determines that the print job includes the cut printing instruction in the step S1 (S1: YES), in a step S3, the controller 100 calculates a first paper sheet length in the conveying direction D1 of the paper sheet P conveyed by the conveying unit 6. The first paper sheet length is a paper sheet length calculated based on conveyance amount of the paper sheet P conveyed by the conveying unit 6. More precisely, the controller 100 calculates the first paper sheet length by obtaining the conveyance amount of the paper sheet P during a period from an output of the ON signal by the registration sensor 120 detecting the leading edge FE of the paper sheet P until an output of the OFF signal by the registration sensor 120 after detecting the trailing edge BE of the paper sheet P. The conveyance amount of paper sheet P is obtained based on the pulse signal output from the rotary encoder 121 in response to the rotation of the conveyance roller 60.

In a step S4, the controller 100 determines whether the first paper sheet length is longer than a second paper sheet length, which is a predetermined paper sheet length. The second paper sheet length is a paper sheet length in the conveying direction D1 associated with a paper sheet size designated in the print job. More precisely, information about paper lengths, which are associated with predetermined sizes of multiple types of the paper sheet P, is stored in the EEPROM 104. The controller 100 obtains information corresponding to a paper sheet size designated in the print job from the EEPROM 104, and compares the first paper sheet length with the second paper length. If it is determined that the first paper sheet length is shorter than the second paper sheet length as a result of the comparison (S4: NO), in a step S5, the controller 100 cancels the cutting process. In a case that the cutting process is canceled, the controller 100 executes a paper discharging process in a step S13 described below and terminates the printing process. On the other hand, if it is determined that the first paper sheet length is equal to or longer than the second paper sheet length (S4: YES), in a step S6, the controller 100 causes the conveyance roller 60 to convey the paper sheet P to the position of the printing unit 3. Next, in a step S7, the controller 100 prints the print data on the conveyed paper sheet P by the printing unit 3. Note that the printing includes recording of images, and the like.

In a step S8, when the printing on the paper sheet P is executed by the printing section 3, the controller 100 determines whether or not the cutting position CL, which is a planned processing position (position to be processed) of the paper sheet P, passes through (exceeds) the cutting unit 7.

The determination as to whether or not the cutting position CL exceeds the cutting section 7 is made by determining whether or not the cutting position CL exceeds the cutting section 7 during intermittent conveying, in which the printing on the paper sheet P by the printing unit 3 and conveying of the aper sheet P by the conveyance roller 60 are repeated.

Specifically, the controller 100 obtains information about the paper sheet length associated with the size of the paper sheet P from the EEPROM 104. Then, based on the information about the paper sheet length associated with the size of the paper sheet P and the conveyance amount of the paper sheet P detected by the rotary encoder 121, the controller 100 determines whether or not the cutting position CL of the paper sheet P exceeds the cutting unit 7.

If the controller 100 determines that the cutting position CL of the paper sheet P does not exceed the cutting unit 7 (S8: NO), the controller 100 returns to the step S6. On the other hand, if the controller 100 determines that the cutting position CL of the paper sheet P exceeds the cutting unit 7 (S8: YES), in a step S9, the controller 100 causes the conveying unit 6 to convey the paper sheet P in order to align the cutting position CL of the paper sheet P with the position of cutting unit 7.

After conveying the paper sheet P to the cutting unit 7 by the conveying unit 6, the controller 100 causes the cutting unit 7 to cut the paper sheet P at the cutting position CL in a step S10, as depicted in FIG. 4A. For example, in a case that the paper sheet P is cut into two equal pieces by the cutting unit 7, the paper sheet P is cut into a first paper sheet P1 and a second paper sheet P2 as depicted in FIG. 4B. In other words, in a case that the paper sheet P is A4 size, the first paper sheet P1 of A5 size and the second paper sheet P2 of A5 size are generated. Note that, in the first conveying route R1, the first paper sheet P1 after cutting is downstream of the second paper sheet P2 in the conveying direction D1. Therefore, the first paper sheet P1 is discharged to the outside of the printing apparatus 1 before the second paper sheet P2 is discharged.

In the steps S7 to S10 described above, the process of printing by the printing unit 3 based on the print data and the process of cutting the paper sheet P at the cutting position CL by the cutting unit 7 are performed for the paper sheet P being conveyed along the first conveying route R1 with the leading edge FE of the paper sheet P being positioned upstream side in the conveying direction D1. As a result, the printing process and the cutting process are performed with respect to the paper sheet P conveyed along the first conveying route R1 with the leading edge FE of the paper sheet P being positioned upstream side in the conveying direction D1. Namely, each process is executed only in the first conveying route R1. Therefore, each process can be executed without switching the leading edge FE and the trailing edge BE or the front surface and the back surface of the paper sheet P. In addition, the time from a start of conveying the paper sheet P to a completion of printing the print data can be shortened.

In a step S11, the controller 100 causes the conveying unit 6 to convey the second paper sheet P2 remaining in the first conveying route R1 to the position of the printing section 3. Specifically, a leading edge FE of the second paper sheet P2 after cutting the paper sheet P is located near the cutting unit 7. Therefore, the controller 100 conveys the second paper sheet P2 in a conveying direction D2 which is opposite to the conveying direction D1, such that the printing section can execute the printing on the second paper sheet P2 based on the print data.

In a step S12, the controller 100 performs printing based on the print data on the second paper sheet P2 which is conveyed to the position of the printing unit 3 by the conveying unit 6. In the step S13, after finishing the printing based on the print data on the second paper sheet P2, the controller 100 discharges the second paper sheet P2 to the outside of the printing apparatus 1. The printing process is then terminated.

Operation and Effect of the Present Embodiment

As explained above, according to this embodiment, in the printing process, it is determined whether the first paper sheet length is shorter than the second paper length. If it is determined that the first paper sheet length is shorter than the second paper sheet length, the cutting process by the cutting unit 7 is not executed. Therefore, if a paper sheet P shorter than expected is conveyed, the cutting process is not executed, thus preventing the paper sheet P from being displaced by the cutting operation. Therefore, cutting quality to the paper sheet P can be prevented from deteriorating. When it is determined that the first paper sheet length is shorter than the second paper sheet length, the printing process by the printing section 3 is not executed, thus the amount of ink used for the printing process can also be reduced.

Second Embodiment

Figure 5:
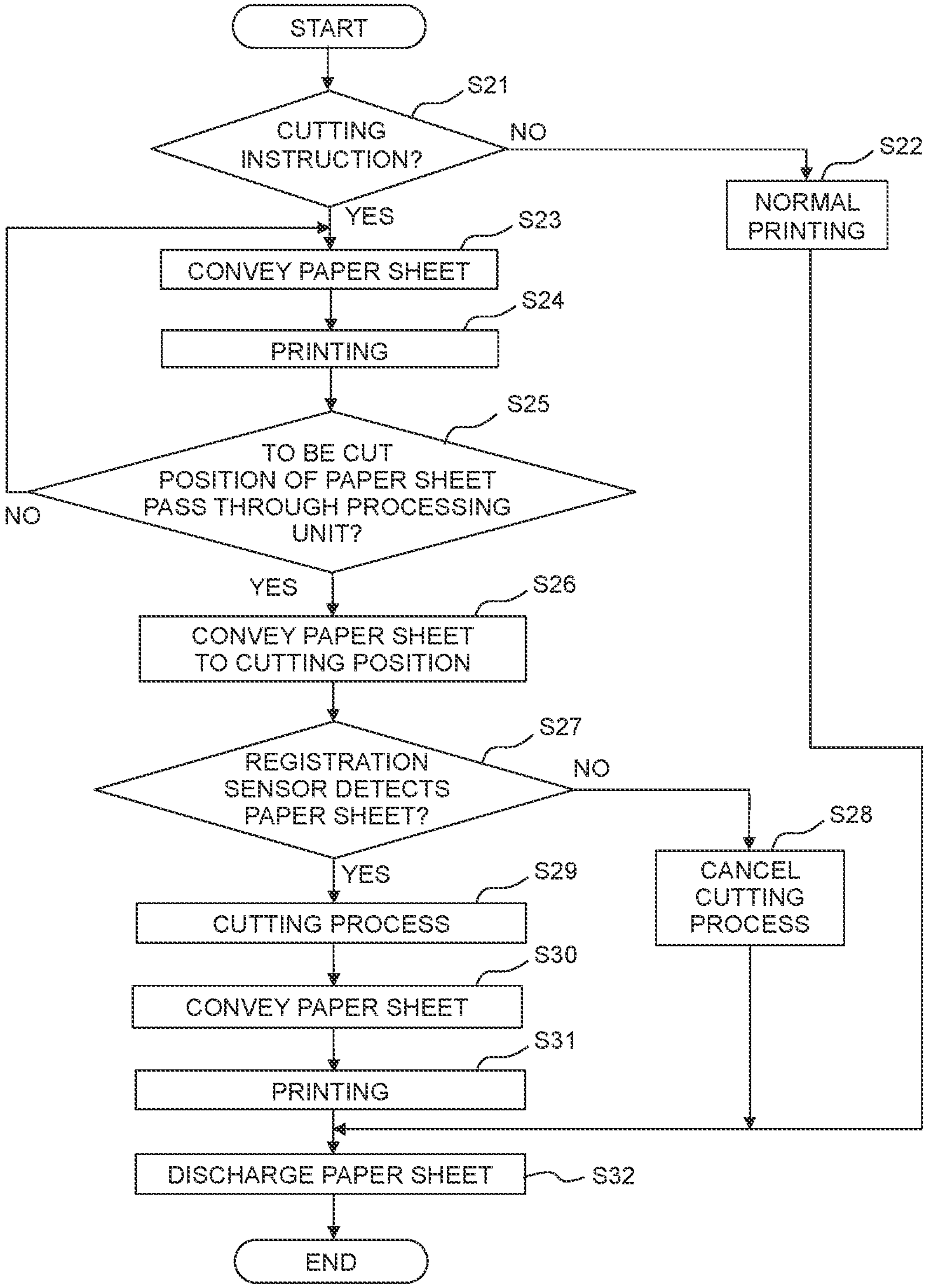
FIG. 5 is a flowchart depicting another control flow by the controller of the printing apparatus.
Figure 6:
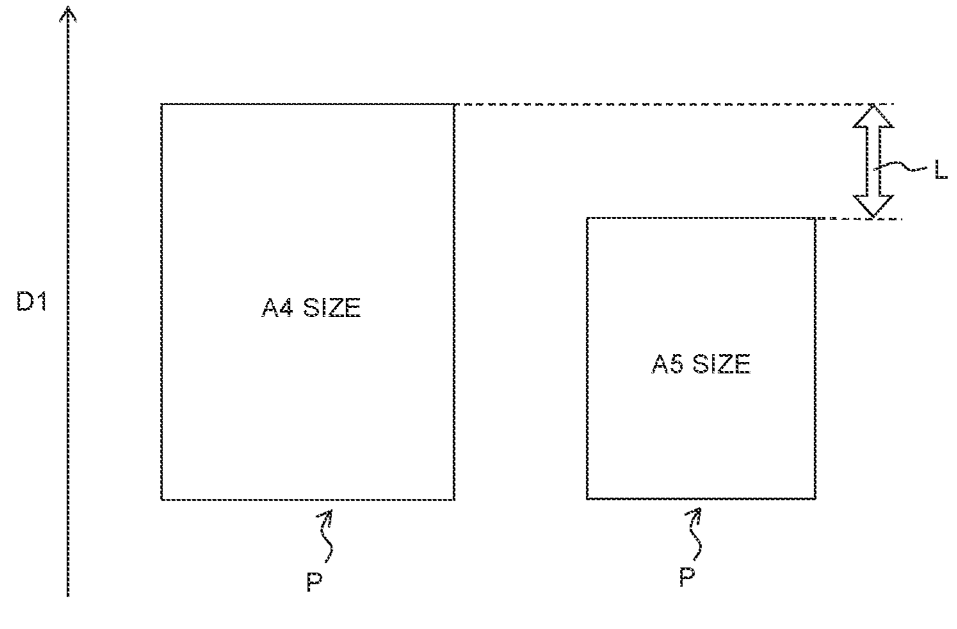
FIG. 6 depicts a comparison of paper lengths between a paper sheet of A4 size and a paper sheet of A5 size.
Figure 7A:
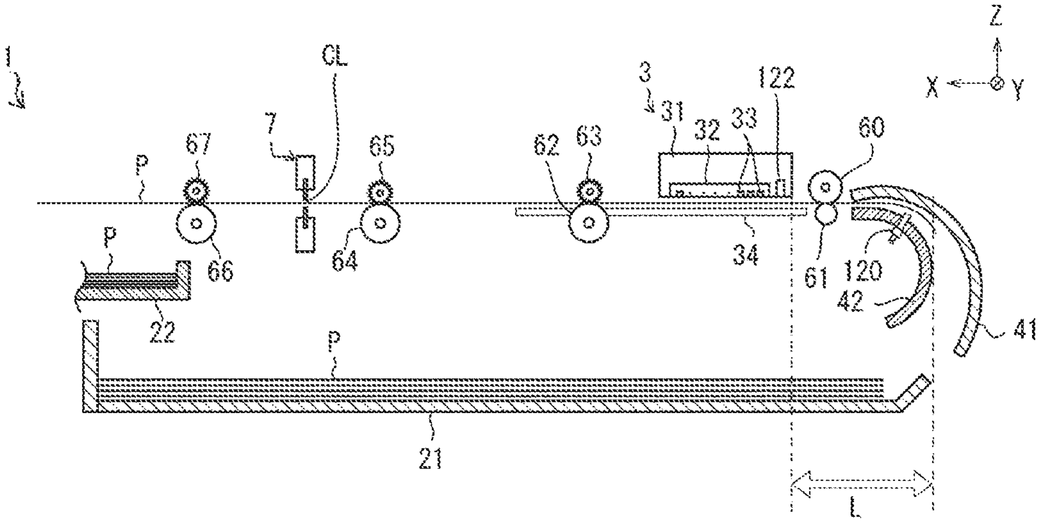
FIG. 7A depicts a state where a paper sheet is detected by a registration sensor.
Figure 7B:
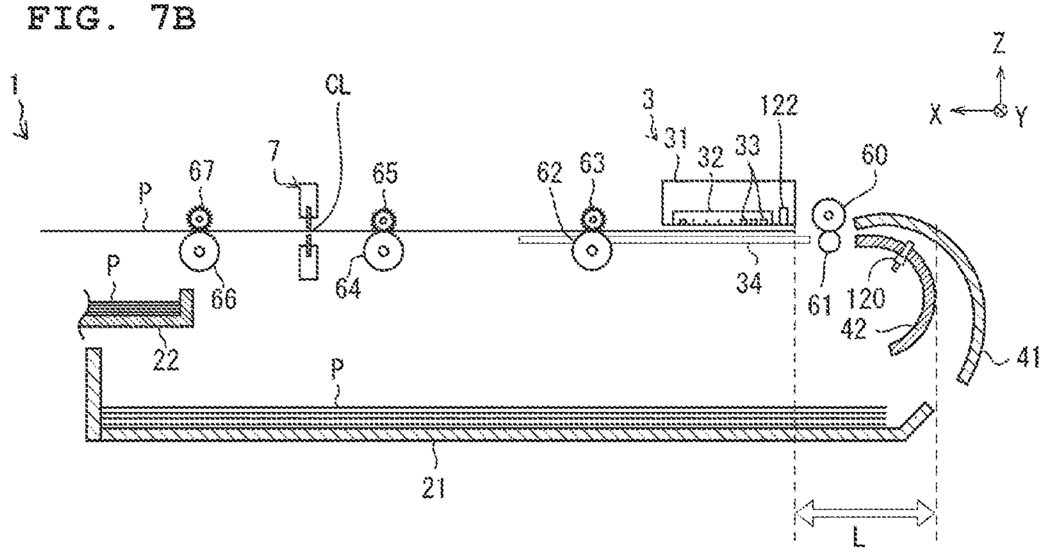
FIG. 7B depicts a state where a paper sheet is not detected by the registration sensor.

A second embodiment of the present disclosure is described below. For convenience of explanation, members that have the same functions as those described in the first embodiment are marked with the same symbols, and their descriptions are not repeated. FIG. 5 is a flowchart depicting a control flow by the controller 100 provided by the printing apparatus 1. FIG. 6 depicts a comparison of paper sheet lengths of an A4 size paper sheet P and an A5 size paper sheet P. FIG. 7A depicts a state that the registration sensor 120 detects the paper sheet P, and FIG. 7B depicts a state that the registration sensor 120 does not detect the paper sheet P.

Of the steps depicted in FIG. 5, steps S21 to S26 are the steps corresponding to the steps S1, S2, and S6-S9 depicted in FIG. 3, respectively.

In step S27, the controller 100 determines whether the paper sheet P is detected by the registration sensor 120 in a state that the cutting position CL of the paper sheet P is conveyed to the position of the cutting unit 7. Specifically, as depicted in FIG. 6, when comparing, for example, an A4 size paper sheet P and an A5 size paper sheet P, there is a difference of a length L depicted in FIG. 6 in the paper sheet length in the conveying direction D1. When there is such a difference in paper sheet length, as depicted in FIG. 7, the result of determining whether the paper sheet P is detected by the registration sensor 120 is different. In detail, in the printing apparatus 1 depicted in FIG. 7A, in a state that an A4 size paper sheet P is conveyed and the cutting position CL of the paper sheet P is conveyed to the cutting unit 7, the paper sheet P is detected by the registration sensor 120. On the other hand, in the printing apparatus 1 depicted in FIG. 7B, in a state that an A5 size paper sheet P is conveyed and the cutting position CL of the paper sheet P is conveyed to the cutting unit 7, the trailing edge of paper sheet P passes through the registration sensor 120, and the paper sheet P is not detected by the registration sensor 120.

Thus, in step S27, if the registration sensor 120 detects the paper sheet P (S27: YES), then the controller executes steps S29 to S32. Note that steps S29 to S32 correspond to the steps S10 to S13 depicted in FIG. 3, respectively. On the other hand, in step S27, if the registration sensor 120 does not detect the paper sheet P (S27: NO), then in step S28, the controller 100 cancels the cutting process. When the cutting process is canceled, the controller 100 executes the paper discharging process according to step S32 and terminates the printing process.

Even when the paper sheet P is not detected by the registration sensor 120, if the paper sheet P is nipped by the conveyance roller 60 and the pinch roller 61, the cutting process by the cutting unit 7 may be executed.

In detail, in a state that the paper sheet P is conveyed to the cutting unit 7 by the conveying unit 6, even after the trailing edge of the paper sheet P has passed the registration sensor 120, if the paper sheet P is held by the conveyance roller 60 and pinch roller 61, the controller 100 executes the cutting process by the cutting section 7. In this case, the controller 100 determines whether the trailing edge of the paper sheet P is nipped by the conveyance roller 60 and the pinch roller 61, based on the signals output from the registration sensor 120 and the rotary encoder 121. Specifically, the paper length calculation is executed in the same manner as the first paper length calculation described above, and the result is used to determine whether the trailing edge of the paper sheet P is nipped by the conveyance roller 60 and the pinch roller 61.

Operation and Effect of the Present Embodiment

As explained above, according to this embodiment, in a state that the cutting position CL of the paper sheet P is conveyed to the position of the cutting unit 7, the controller 100 determines whether to execute the cutting process, based on whether the paper sheet P is detected by the registration sensor 120. The registration sensor 120 is located upstream in the conveying direction D1 from the conveyance roller 60 and the pinch roller 61, which are located upstream in the conveying direction D1 from the printing unit 3. Namely, in the state that the cutting position CL of the paper sheet P is conveyed to the position of the cutting unit 7, if the conveyed paper sheet P is detected by the registration sensor 120, the paper sheet P is nipped by the conveyance roller 60 and the pinch roller 61. Therefore, the cutting process can be executed with the paper sheet P being nipped by the conveyance roller 60 and the pinch roller 61. On the other hand, if the paper sheet P is not detected by the registration sensor 120, the paper sheet P may not be nipped by the conveyance roller 60 and the pinch roller 61. In this case, the cutting process is not executed. Therefore, the shift of the paper sheet P due to the cutting operation of the cutting unit 7 can be suppressed. In other words, the quality of cutting to paper sheet P can be prevented from deteriorating.

According to the above configuration, in state that the cutting position CL of the paper sheet P is conveyed to the position of the cutting unit 7, even if the paper sheet P is not detected by the registration sensor 120, if the paper sheet P is nipped by the conveyance roller 60 and the pinch roller 61, the cutting process by the cutting section 7 is executed. Therefore, even in a state that the paper sheet P has passed the registration sensor 120, it can be determined whether the cutting process is necessary.

Third Embodiment

A third embodiment of the present disclosure is described below. For convenience of explanation, members having the same functions as those described in the first embodiment are indicated with the same symbols, and their descriptions are not repeated.

Configuration of Printing Apparatus

Figure 8:
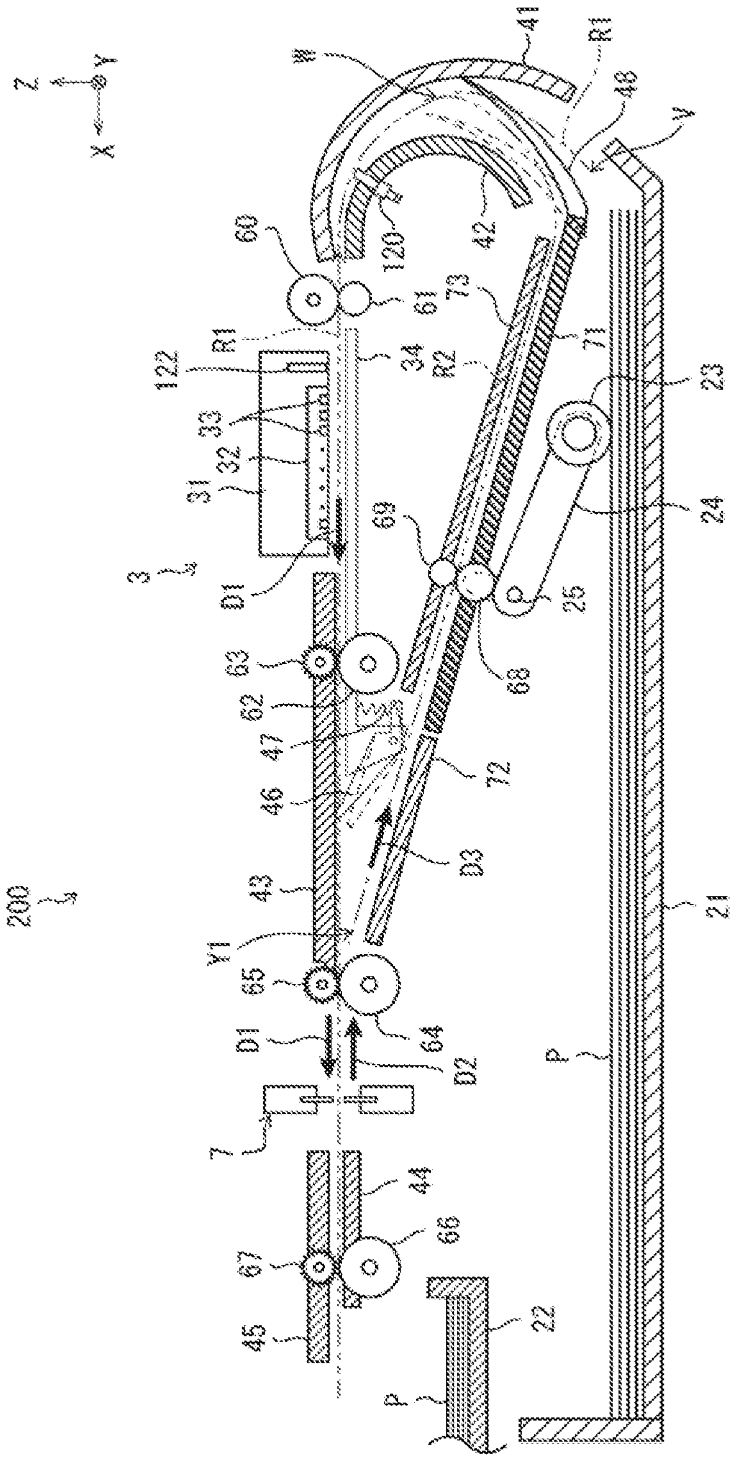
FIG. 8 is a cross-sectional view depicting an internal structure of another printing apparatus according to the present disclosure.

FIG. 8 is a cross-sectional view depicting an internal structure of the printing apparatus 200 according to the third embodiment of the present disclosure.

Unlike the printing apparatus 1, the printing apparatus 200 has a second conveying route R2, a first flap 46, a second flap 48, and a media sensor 122 which is an example of the detection unit.

The second conveying route R2 is a different route from the first conveying route R1 and is used to convey the paper sheet P in a conveying direction D2 and then P in a conveying direction D3. Specifically, the second conveying route R2 is demarcated by guide members 71, 72, 73, a conveyance roller 68, and a pinch roller 69.

The second conveying route R2 branches from the first conveying route R1 at a branching position Y1 located upstream from the conveyance roller 64 in the first conveying route R1. The second conveying route R2 is connected to the first conveying route R1 at a merging position W located upstream from the printing unit 3 in the first conveying route R1.

Between the conveyance roller 62 and the conveyance roller 64 in the first conveying route R1, a first flap 46 is provided. The first flap 46 is provided near the branching position Y1 facing the guide member 43. The first flap 46 is supported by the platen 34 to rotate between a first state and a second state.

In a first state depicted by a solid line in FIG. 8, the first flap 46 contacts the guide member 43 to close the first conveying route R1. On the other hand, in a second state depicted by a broken line in FIG. 8, the first flap 46 is positioned lower than in the first state and is separated from the guide member 43 to allow the paper sheet P conveyed in the conveying direction D1 to pass through the first flap 46.

The first flap 46 is biased in a Z-axis positive direction by a coil spring 47. One end of the coil spring 47 is connected to the first flap 46, and the other end of the coil spring 47 is connected to the platen 34. The first flap 46 is in the first state by being biased by the coil spring 47, and a front end of the first flap 46 contacts the guide member 43.

At the merging position W of the first conveying route R1 and the second conveying route R2, the second flap 48 is provided rotatably on the guide member 71. Specifically, the second flap 48 is rotatable between a first state depicted by a solid line in FIG. 8 and a second state depicted by a broken line in FIG. 8. In the first state of the second flap 48, a part of the second conveying route R2 is demarcated by the second flap 48 and the guide member 42. In the second state of the second flap 48, a part of the first conveying route R1 is demarcated by the second flap 48 and the guide member 41.

By the controller 100, the conveyance roller 64 is rotated in reverse and the conveyance roller 68 is rotated. After the paper sheet P with print data printed on one side is conveyed along the conveying direction D3 in the second conveying route R2, the paper sheet P can be conveyed to the first conveying route R1 with the front and back sides reversed once. This makes it possible to print images on both sides of the paper sheet.

The media sensor 122 is provided in the printing section 3. The media sensor 122 is a sensor for detecting whether there is the paper sheet P on the platen 34. The media sensor 122 is used to detect that the leading edge FE of the paper sheet P conveyed in the first conveying route R1 reaches the printing section 3. The media sensor 122 may detect the length of the paper sheet P. The media sensor 122 is connected to the ASIC 105. Based on the signal output from the media sensor 122, the controller 100 may detect the state of the printing device 200.

Control Flow by Controller

Figure 9A:
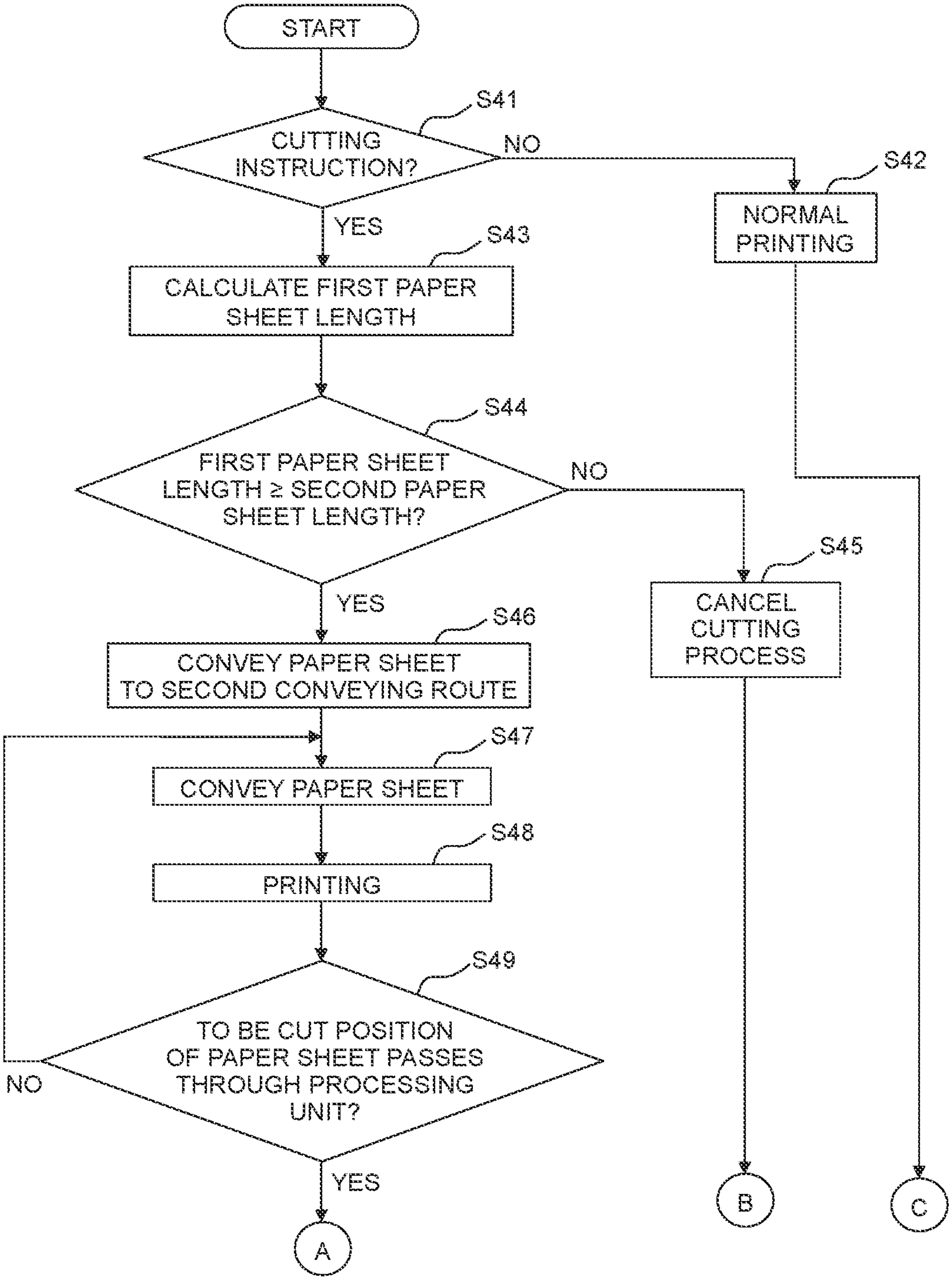
FIGS. 9A and 9B are a flowchart depicting a control flow by a controller of another printing apparatus of the present disclosure.
Figure 9B:
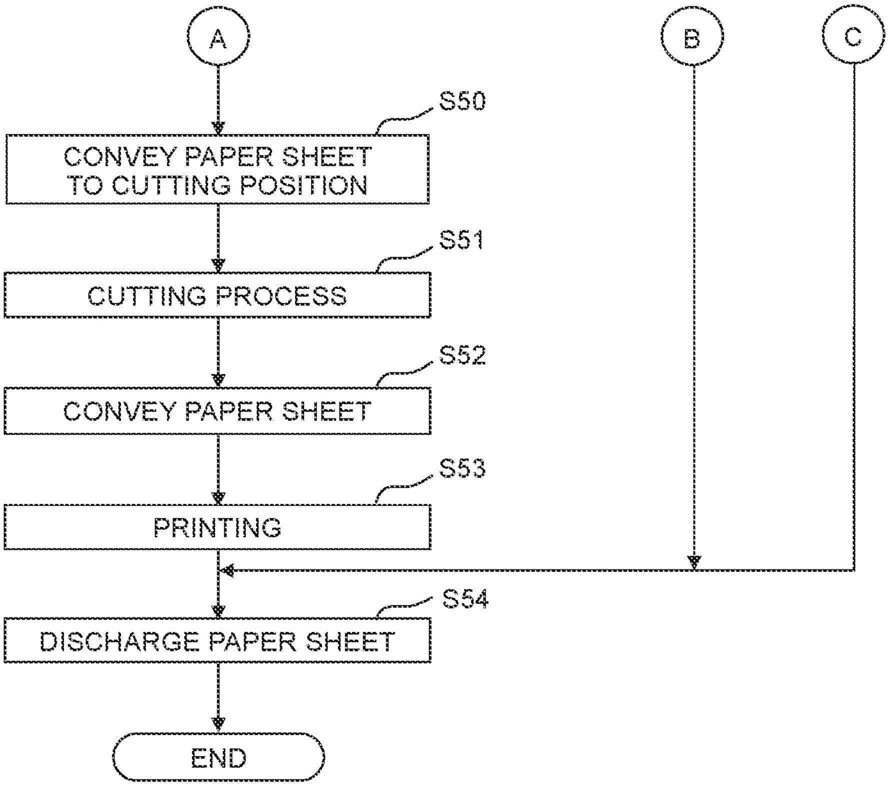

FIGS. 9A and 9B are a flowchart depicting a control flow by the controller 100 included in the printing apparatus 200 according to the third embodiment of the present disclosure.

In the flowchart depicted in FIGS. 9A and 9B, steps S41 to S45 and S47 to S54 are similar to the steps S1 to S5 and the steps S6 to S13 depicted in FIG. 3, respectively. In the following, a case of YES in step S44, that is, a case that the controller 100 determines that the first paper sheet length is equal to or longer than the second paper sheet length is considered.

In step S44, if the controller 100 determines that the first paper sheet length is equal to or longer than the second paper sheet length (S44: YES), the controller 100 performs a switchback process in which the conveying unit 6 conveys the paper sheet P in the conveying direction D2 and then in the conveying direction D3. By executing the switchback process, the controller 100 conveys the paper sheet P to the second conveying route R2 different from the first conveying route R1. On the other hand, if the controller 100 determines that the first paper sheet length is shorter than the second paper length (S44: NO), the controller 100 executes the paper discharging process in step S54 and terminates the printing process, without executing the switchback process and the cutting process.

In step S44, if the controller 100 determines that the first paper sheet length is equal to or longer than the second paper length (S44: YES), the switchback process is executed. However, if the controller 100 determines that the first paper sheet length is equal to or longer than the second paper sheet length (S44: YES), the paper sheet P used to calculate the first paper sheet length may be discharged. In this case, a new paper sheet P different from the discharged paper sheet P is fed from the feed tray 21, and the steps S47 to S54 are executed for the newly fed paper sheet P.

The printing apparatus 200 may use a media sensor 122, which is an example of a detecting unit, to calculate the first paper sheet length of the paper sheet P. Specifically, the controller 100 may calculate the length of the paper sheet P, based on a conveyance amount of the paper sheet P detected by the rotary encoder 121 during a time period from the detection of the leading edge FE of the paper sheet P by the media sensor 122 to the detection of the trailing edge BE of the paper sheet P by the media sensor 122 in the process of conveying the paper sheet P from the first conveying route R1 to the second conveying route R2.

Operation and Effect of the Present Embodiment

As explained above, according to this embodiment, the first paper sheet length of the paper sheet P conveyed before the printing process is calculated. If the controller 100 determines that the first paper sheet length is equal to or longer than the second paper sheet length, the paper sheet P is conveyed to the second conveying route R2, and then the printing process and the cutting process are executed. Furthermore, if the controller 100 determines that the first paper sheet length is shorter than the second paper sheet length, the controller 100 discharges the conveyed paper sheet P to the outside. This prevents the paper sheet P from being displaced by the cutting operation, because the cutting process is not executed when a paper sheet P that is shorter than expected is conveyed. Therefore, the quality of cutting the paper sheet P can be prevented from deteriorating. Since the printing process is not executed, the amount of ink to be used for the printing process can also be reduced. If it is determined that the first paper sheet length is equal to or longer than the second paper length, the paper sheet P used to calculate the first paper sheet length is discharged, and the printing process and cutting process are executed to another paper sheet P different from the discharged paper sheet P. This reduces the possibility of executing the printing process and the cutting process to a shorter paper sheet P than expected, as compared with a case of executing the printing process and the cutting process to the paper sheet P used for calculating the first paper sheet P. Further, the amount of ink used for the printing process can also be reduced.

First Modification

In the above description, the printing apparatus (1, 200) cuts the paper sheet P by the cutting unit 7 to divide the paper sheet P into a plurality of sheet. However, instead of the cutting unit 7, the printing apparatus (1, 200) may be equipped with a processing section, as an example of the processing unit, that performs a perforation forming processing on the paper sheet P. In this case, the controller 100 performs a processing process to execute the perforation forming process on the paper sheet P by the processing section at a processing position that is an example of a dividing position of the paper sheet P. The processing position is the same position as the cutting position CL.

Specifically, the processing section has a perforation cutter with blades formed at equal intervals on a circumference of a disk and the cutter carriage described above. The processing section forms perforations on the paper sheet P by moving the cutter carriage in the width direction of the paper sheet P and forming a plurality of cuts at intervals along the processing position of the paper sheet P by the perforation cutter.

Second Modification

Figure 10A:
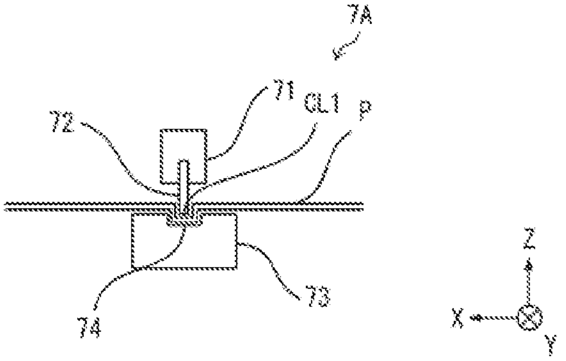
FIGS. 10A and 10B depict configurations of processing units as modifications of a cutting unit of the printing apparatus.
Figure 10B:
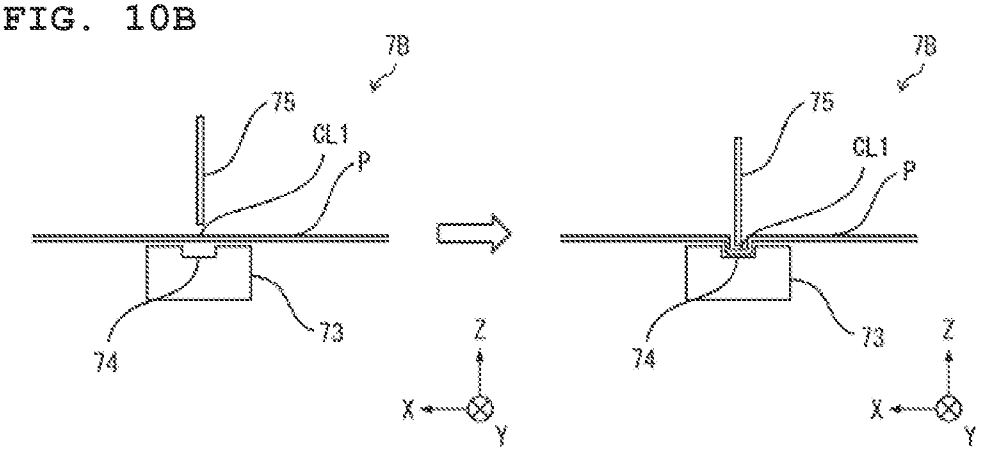

FIGS. 10A and 10B depict configurations of processing sections 7A and 7B which are modifications of the cutting unit 7 included in the printing apparatus (1, 200). Instead of the cutting unit 7, the printing apparatus 1 may include a processing section 7A that performs crease formation processing on the paper sheet P, as depicted in FIG. 10A. In this case, the controller 100 performs processing process by executing the crease formation processing on the paper sheet P by the processing section 7A at the processing position CL1.

The processing section 7A has a cutter carriage 71, a blade 72, and a clamping member 73. The blade 72 is a round blade and is provided on the cutter carriage 71. The blade 72 is formed so that it does not cut the paper sheet P when it contacts the paper sheet P. A recess 74 is formed in the clamping member 73, and the recess 74 is located at a position facing the blade 72. The processing section 7A moves the cutter carriage 71 in the width direction of the paper sheet P so that the paper sheet P is pressed against the recess 74 by the blade 72. As a result, a crease is formed along the processing position CL1 of the paper sheet P.

Instead of the cutting unit 7, the printing apparatus (1, 200) may also include a processing section 7B, as an example of the processing unit, as depicted in FIG. 10B. The processing section 7B has a clamping member 73 and an extrusion member 75. The extrusion member 75 is a member for pushing the paper sheet P in a Z-negative direction at the processing position CL1. For example, the extrusion member 75 is a rectangular-shaped blade that extends in a Y direction and is formed such that the blade does not cut the paper sheet P even if the blade contacts the paper sheet P. The recess 74 formed in the clamping member 73 is arranged at a position facing the extrusion member 75.

The processing section 7B moves the extrusion member 75 in the Z-negative direction to bring the extrusion member 75 into contact with the paper sheet P along the processing position CL1, and push the paper sheet P at the processing position CL1 in the Z-negative direction. The processing unit 7B also pinches the paper sheet P pushed out by the extrusion member 75 with the recess 74 of the clamping member 73 to form the crease at the processing position CL1.

Third Modification

In the case that the cutting process is canceled in the above step (S5, S28, S45), the controller 100 executes the paper discharging process and terminates the printing process. However, in the case that the cutting process is canceled, the controller 100 may be configured to complete printing of the print data included in a received print job, discharge the paper sheet P, and then terminate the printing process. According to this configuration, the printing process on the paper sheet P is completed even if the cutting process is canceled. Thus, printing on the paper sheet P can be completed while preventing a deterioration in the cutting quality to the paper sheet P.

Fourth Modification

In the printing apparatus (1, 200) described above, the number of print jobs received by the controller 100 is not mentioned, but the controller 100 may receive one or more print jobs. In a case that multiple print jobs are received by the controller 100, for example, the controller 100 may be configured such that if the controller 100 does not execute the cutting process for a first print job, which is the first print job among multiple consecutive print jobs, the controller 100 completes the printing of the print data included in the first print job and cancel a second print job subsequent to the first print job. When the print job is canceled, feeding of the paper sheet P stored in the feed tray 21 and printing of the print data included in the print job are not executed. According to this configuration, the subsequent print job among the multiple received print jobs is canceled. As a result, the print data included in the subsequent print job is not printed on paper sheet P, and the amount of ink used in the printing process can be reduced.

Fifth Modification

In the printing apparatus (1, 200) described above, the controller 100 may be configured to stop the printing process in a case that the cutting process is not executed. According to this configuration, the printing process is stopped when the controller determines that the cutting process will not be executed. Therefore, the amount of ink used for the printing process can be reduced, as compared with the case where subsequent print jobs are canceled.

Sixth Modification

The printing apparatus (1, 200) may be provided with a settings unit having a display screen. The setting unit consists of, for example, a touch panel, and is configured to allow the user to make various settings related to printing by the printing apparatus 1, by touch operation.

The information set by the setting unit is output to the controller 100. The setting unit accepts the setting whether or not to execute the cutting process to cut the paper sheet P. In other words, the user can select whether or not to execute the cutting process by the setting unit.

If a command not to execute the cutting process is selected in the setting unit, the controller 100 determines not to execute the cutting process. If a command to execute the cutting process is selected in the setting unit, the controller 100 determines to execute the cutting process.

The present disclosure is not limited to the above-described embodiments and modifications, and various changes are possible within the scope of the claims, and embodiments obtained by combining technical means disclosed in the different embodiments and modifications as appropriate are also included in the technical scope of the present disclosure.

What is claimed is:

1. A printing apparatus, comprising:

a conveying unit configured to convey a printing medium in a conveying direction;

a printing unit configured to print an image on the printing medium based on print data included in a print job;

a processing unit including a processing member and configured to cut the printing medium, form perforations in the printing medium, or form a crease in the printing medium, by moving the processing member in a state that the processing member contacts the printing medium; and a controller configured to execute a printing process in which the image is printed on the printing medium based on the print data by the printing unit, wherein in the printing process, in a case that the controller determines that a first length in the conveying direction of the printing medium conveyed by the conveying unit is equal to or longer than a predetermined second length, the controller executes cutting the printing medium, forming perforations in the printing medium, or forming a crease in the printing medium, and in a case that the controller determines that the first length is shorter than the predetermined second length, the controller does not execute cutting the printing medium, forming perforations in the printing medium, or forming a crease in the printing medium.

2. The printing apparatus according to claim 1, wherein the controller is configured to calculate the first length based on conveyance amount of the printing medium conveyed by the conveying unit.

3. The printing apparatus according to claim 1, wherein the predetermined second length is a length in the conveying direction associated with a paper sheet size designated in the print job.

4. The printing apparatus according to claim 1, further comprising a detecting unit arranged upstream in the conveying direction from the conveying unit and configured to detect the printing medium conveyed by the conveying unit, wherein in a state of the printing medium being conveyed to a processing position of the processing unit, in a case that the detecting unit detects the printing medium, the controller is configured to execute the cutting the printing medium, forming perforations in the printing medium, or forming a crease in the printing medium, and in a case that the detecting unit does not detect the printing medium, the controller is configured not to execute the cutting the printing medium, forming perforations in the printing medium, or forming a crease in the printing medium.

5. The printing apparatus according to claim 4, wherein the conveying unit is arranged upstream in the conveying direction from the printing unit.

6. The printing apparatus according to claim 4, wherein, in a state of the printing medium being conveyed to the processing position of the processing unit after the detecting unit has detected a trailing edge of the printing medium, in a case that the printing medium is nipped by the conveying unit, the controller is configured to execute the cutting the printing medium, forming perforations in the printing medium, or forming a crease in the printing medium, and in a case that the printing medium is not nipped by the conveying unit, the controller is configured not to execute the cutting the printing medium, forming perforations in the printing medium, or forming a crease in the printing medium.

7. The printing apparatus according to claim 1, wherein in a case that the controller executes no cutting the printing medium, forming perforations in the printing medium, or forming a crease in the printing medium, the controller is configured to complete the printing process.

8. The printing apparatus according to claim 1, wherein in a case that the controller receives a plurality of print jobs including the print job and does not execute the cutting the printing medium, forming perforations in the printing medium, or forming a crease in the printing medium based on a first print job included in the print jobs, the controller is configured to complete the printing process based on the first print job and cancel a second print job subsequent to the first print job.

9. The printing apparatus according to claim 1, wherein in a case that the controller executes no cutting the printing medium, forming perforations in the printing medium, or forming a crease in the printing medium, the controller is configured to stop the printing process.

10. The printing apparatus according to claim 1, further comprising a first conveying route for conveying the printing medium in the conveying direction, wherein the controller is configured to execute the printing process and the cutting the printing medium, forming perforations in the printing medium, or forming a crease in the printing medium with respect to the printing medium being conveyed along the first conveying route with a leading edge of the printing medium being positioned upstream in the conveying direction from a trailing edge of the printing medium.

11. The printing apparatus according to claim 1, further comprising a first conveying route for conveying the printing medium in the conveying direction, wherein in a case that the first length is equal to the predetermined second length, the controller is configured to execute the printing process and the cutting the printing medium, forming perforations in the printing medium, or forming a crease in the printing medium after executing a switchback process in which the printing medium is conveyed in a reverse direction opposite to the conveying direction by the conveying unit along a second conveying route different from the first conveying route, and in a case that the first length is shorter than the second length, the controller is configured to execute a discharge process in which the printing medium is discharged outside the printing apparatus, without executing the switchback process.

12. The printing apparatus according to claim 11, wherein in a case that the first length is equal to the predetermined second length, the controller is configured to execute the discharge process, and execute the printing process and the cutting the printing medium, forming perforations in the printing medium, or forming a crease in the printing medium with respect to another printing medium different from the printing medium discharged in the discharge process after conveying the another printing medium by the conveying unit.

13. The printing apparatus according to claim 1, wherein the processing unit is arranged downstream in the conveying direction from the printing unit.

* * * * *